United States Patent
Otani et al.

(10) Patent No.: US 12,503,102 B2
(45) Date of Patent: Dec. 23, 2025

(54) PARKING ASSISTANCE DEVICE AND PARKING ASSISTANCE METHOD

(71) Applicant: Panasonic Automotive Systems Co., Ltd., Kanagawa (JP)

(72) Inventors: Maiko Otani, Kanagawa Ken (JP); Hirofumi Nishimura, Kanagawa Ken (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 145 days.

(21) Appl. No.: 18/608,297

(22) Filed: Mar. 18, 2024

(65) Prior Publication Data

US 2024/0326784 A1    Oct. 3, 2024

(30) Foreign Application Priority Data

Mar. 28, 2023   (JP) ................. 2023-050770

(51) Int. Cl.
  *B60Q 1/48*   (2006.01)
  *B60W 30/06*  (2006.01)
  *B60W 50/14*  (2020.01)
  *G05D 1/224*  (2024.01)
  *G05D 109/10* (2024.01)

(52) U.S. Cl.
  CPC ............ *B60W 30/06* (2013.01); *B60W 50/14* (2013.01); *G05D 1/2244* (2024.01); *B60W 2050/146* (2013.01); *B60W 2540/215* (2020.02); *G05D 2109/10* (2024.01)

(58) Field of Classification Search
  CPC ................ B60W 30/06; B60W 50/14; B60W 2050/146; B60W 2540/215; G05D 1/2244; G05D 2109/10; B62D 15/027; B62D 15/0285

USPC ..... 340/932.2, 933, 937, 903, 988, 435, 436
  See application file for complete search history.

(56) References Cited

U.S. PATENT DOCUMENTS

| | | | | |
|---|---|---|---|---|
| 10,450,004 | B2* | 10/2019 | Kamiyama | B60W 30/06 |
| 2015/0219760 | A1* | 8/2015 | Hiramaki | B62D 15/0285 367/99 |
| 2016/0078763 | A1* | 3/2016 | Kiyokawa | G06V 20/588 382/104 |
| 2020/0298839 | A1* | 9/2020 | Inoue | B60W 10/20 |

FOREIGN PATENT DOCUMENTS

JP    2020-107045    7/2020

* cited by examiner

*Primary Examiner* — Anh V La
(74) *Attorney, Agent, or Firm* — Greenblum & Bernstein, P.L.C.

(57) ABSTRACT

A parking assistance device according to the present disclosure performs automatic traveling of a vehicle based on teacher traveling by a user, and includes a memory and a processor coupled to the memory. The processor is configured to: cause the memory to store information about a travel path in the teacher traveling; correct the travel path in order that a position of a target position of the automatic traveling in a vehicle width direction is closer to a structure defining a parking area configured to park the vehicle and a path to the target position having a curvature smaller than a threshold is kept longer, according to a relative positional relationship between the structure and a start position of the automatic traveling on the travel path; and control the vehicle based on the corrected travel path.

16 Claims, 8 Drawing Sheets

PARKING ASSISTANCE DEVICE AND PARKING ASSISTANCE METHOD

CROSS-REFERENCE TO RELATED APPLICATIONS

This application is based upon and claims the benefit of priority from Japanese Patent Application No. 2023-050770, filed on Mar. 28, 2023, the entire contents of which are incorporated herein by reference.

FIELD

Embodiments described herein relate generally to a parking assistance device and a parking assistance method.

BACKGROUND

Conventional parking assistance techniques are known to move vehicles by automatic driving when parking the vehicles. As one of such parking assistance techniques, there is known a technique to automatically assist a vehicle stopped at a predetermined initial stop position by a car driver to travel for parking to a parking position from the initial stop position, when the driver parks the vehicle in a parking space where the driver frequently parks, for example, when the driver parks the vehicle in a garage or the like at home.

Furthermore, techniques have been proposed to perform, in a parking space where safety is secured, parking closer to a wall defining the parking space (hereinafter, also referred to as "pulling over to park"), on the basis of a stored path, or parking at substantially the center position of the parking space for ease of getting in and out of the vehicle. Conventional technologies are described in Japanese Patent Application Laid-open No. 2020-107045, for example.

However, in the conventional art, for example, for controlling the vehicle to pull over to park while avoiding contact with the wall, there is a possibility that the vehicle cannot be pulled over to park at a parking position desired by the driver due to a too-small distance to the wall.

SUMMARY

A parking assistance device according to an embodiment of the present disclosure performs automatic traveling of a vehicle based on teacher traveling by a user, and includes a memory and a processor coupled to the memory. The processor is configured to: cause the memory to store information about a travel path in the teacher traveling; correct the travel path in order that a position of a target position of the automatic traveling in a vehicle width direction is closer to a structure defining a parking area configured to park the vehicle and a path to the target position having a curvature smaller than a threshold is kept longer, according to a relative positional relationship between the structure and a start position of the automatic traveling on the travel path; and control the vehicle based on the corrected travel path.

DETAILED DESCRIPTION

Preferred embodiments of the present disclosure will be described in detail below with reference to the accompanying drawings.

As a use scene of a parking assistance system including a parking assistance device of the present embodiment, a scene is exemplified where a vehicle automatically parks after a user gets out of the vehicle, for parking the vehicle in a parking lot at a user's house Note that in the present embodiment, in the example the vehicle automatically parks after the user gets out of the vehicle, but the vehicle may automatically park with the user in the vehicle.

In this scene, after getting out of the vehicle at a predetermined position in the parking lot, the user gives an instruction for the vehicle to automatically park, via a communication terminal of the user. After giving the instruction, the user enters the house, and the vehicle automatically parks to a parking position. Note that the user may give an instruction for the vehicle to automatically park via an in-vehicle infotainment (IVI) system or the like.

Configuration of Parking Assistance System

Figure 1:
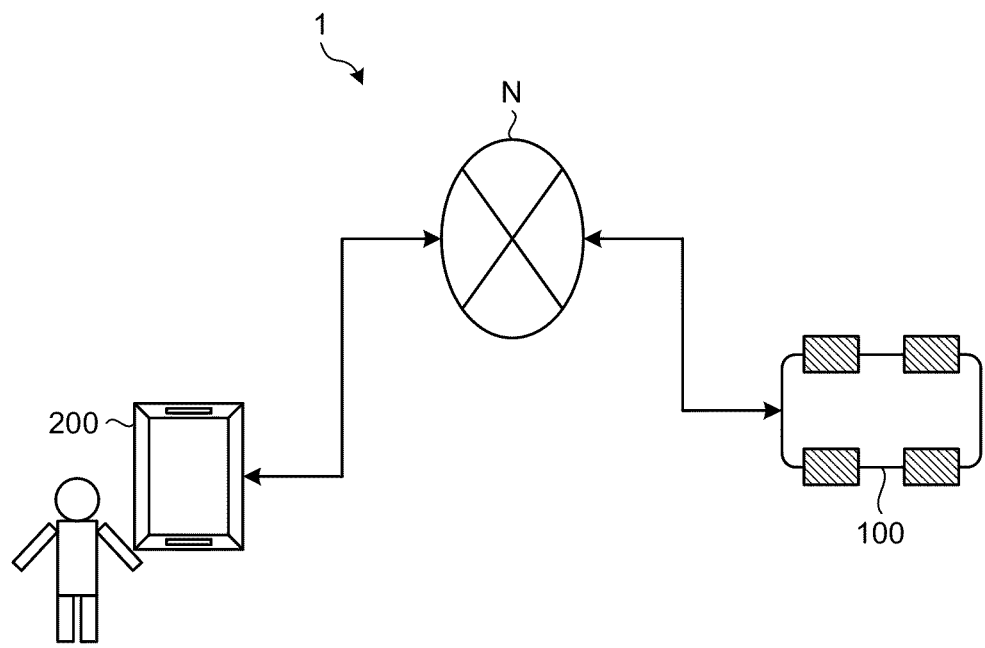
FIG. 1 is a diagram illustrating an exemplary configuration of a network of a parking assistance system according to an embodiment.

First, a configuration of the parking assistance system will be described with reference to FIG. 1. FIG. 1 is a diagram illustrating an exemplary configuration of a network N of the parking assistance system 1 according to a first embodiment.

As illustrated in FIG. 1, the parking assistance system 1 according to the first embodiment includes a vehicle 100 and a communication terminal 200. The vehicle 100 and the communication terminal 200 are connected to each other by the network N. The network N includes a public network such as the Internet, a wireless network for a mobile phone network, a dedicated network such as a virtual private network (VPN), and a network such as a local area network (LAN).

Configuration of Vehicle

Next, a configuration of the vehicle 100 will be described. The vehicle 100 includes a vehicle body and two pairs of wheels arranged along the vehicle body in a predetermined direction. The two pairs of wheels include a pair of front tires and a pair of rear tires. Note that, in FIG. 1, although the vehicle 100 includes four wheels, the number of wheels is not limited thereto. For example, the vehicle 100 may be a two-wheeled vehicle.

The vehicle body is connected to the wheels and is movable by the wheels. In this configuration, the predetermined direction in which the two pairs of wheels are arranged is a traveling direction (movement direction) of the vehicle 100. The vehicle 100 is configured to move forward or backward by shifting gears, or the like. Furthermore, the vehicle 100 is also configured to turn right and left by steering.

A wave transmitter/receiver 110 (see FIG. 2) that transmits and receives a sound wave such as an ultrasonic wave is arranged at a predetermined end of the vehicle body. For example, one or more wave transmitter/receivers 110 are arranged on a front bumper, and one or more wave transmitter/receivers 110 are arranged on a rear bumper. Hereinafter, when the wave transmitter/receivers 110 arranged on the front bumper and the wave transmitter/receivers 110 arranged on the rear bumper are not particularly limited, they are simply referred to as the wave transmitter/receivers 110.

Figure 2:
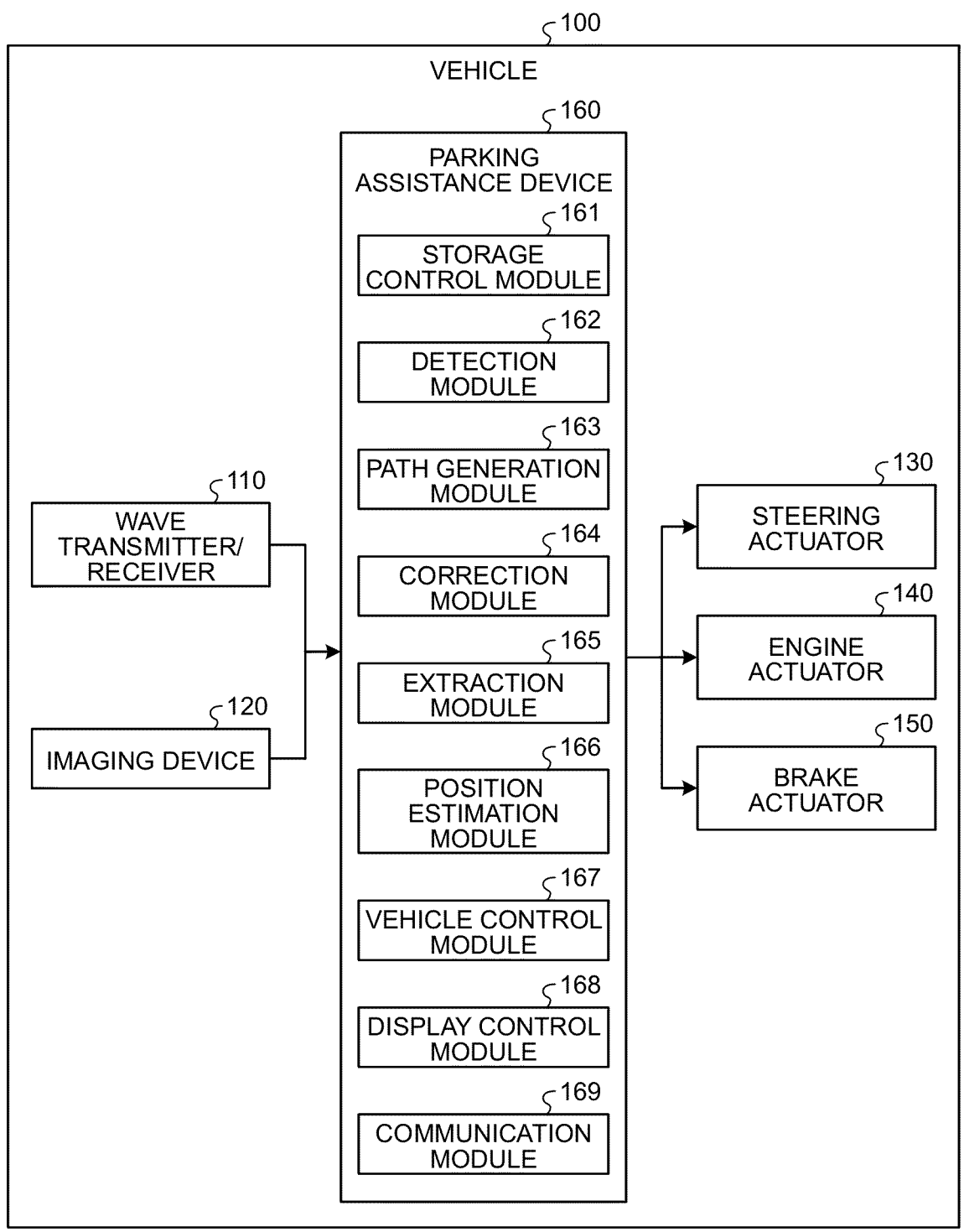
FIG. 2 is an exemplary functional block diagram of a parking assistance device according to the embodiment.

In addition, the vehicle 100 includes an imaging device 120, a steering actuator 130, an engine actuator 140, a brake actuator 150, and a parking assistance device 160 (see FIG. 2).

Each of the wave transmitter/receivers 110 is, for example, a distance sensor. The distance sensor is, for example, an ultrasonic sonar. For example, when the vehicle 100 is traveling in a parking lot, the ultrasonic sonar emits an ultrasonic wave, detecting a distance between the vehicle 100 and a wall which is described later, on the basis of detection of a reflected wave that is an ultrasonic wave reflected from the wall. Note that the ultrasonic sonar may detect a distance to an obstacle around the vehicle 100.

The ultrasonic sonar calculates contour points of an object on the basis of a distance to the object, and detects feature points of the object, on the basis of the contour points. Note that the distance sensor is not limited to the ultrasonic sensor, and may be, for example, a millimeter-wave radar or a light detection and ranging, laser imaging detection and ranging (LiDAR).

The imaging device 120 is, for example, a visible light camera. For example, the vehicle 100 includes a first imaging device that captures an image in front of the vehicle 100, a second imaging device that captures an image in back of the vehicle 100, a third imaging device that captures an image from the left side of the vehicle 100, and a fourth imaging device captures an image from the right side of the vehicle 100. Hereinafter, when the first imaging device, the second imaging device, the third imaging device, and the fourth imaging device are not particularly distinguished, the imaging devices are simply referred to as the imaging devices 120.

Furthermore, although details will be described later, each of the imaging devices 120 is applied to, for example, detecting the feature points of an object positioned around the vehicle 100 to estimate the current position of the vehicle 100 on the basis of a positional relationship between the vehicle 100 and the feature points. Each imaging device 120 outputs an image signal captured, to the parking assistance device 160.

Note that the imaging device 120 is not limited to the visible light camera, and may be, for example, a CCD camera or a CMOS camera. Furthermore, the image to be captured may be a still image or a moving image. Furthermore, the imaging device 120 may be a camera built in the vehicle 100, a dashboard camera mounted later to the vehicle 100, or the like.

Note that, instead of the imaging device 120, an ultrasonic sensor, LiDAR, a radar, or the like as the distance sensor may be used for a sensor for estimating the current position of the vehicle 100.

The steering actuator 130 adjusts a steering angle of the vehicle 100 on the basis of an output from the parking assistance device 160 which is described later. The parking assistance device 160 transmits a target steering angle to the steering actuator 130 to control the steering angle.

The parking assistance device 160 controls the steering actuator 130 to control a turning curvature during traveling of the vehicle 100. The engine actuator 140 adjusts the amounts of fuel and air supplied to an engine, on the basis of an output from the parking assistance device 160. The brake actuator 150 adjusts a braking forces of the wheels, on the basis of the output from the parking assistance device 160.

The parking assistance device 160 is mounted on the vehicle 100. The parking assistance device 160 is an information processing device that is configured to be mounted on a vehicle. The parking assistance device 160 is, for example, an electronic control unit (ECU) or on board unit (OBU) provided inside the vehicle 100. Alternatively, the parking assistance device 160 may be an external device installed near a dashboard of the vehicle 100. Note that the parking assistance device 160 may also serve as a car navigation device or the like.

FIG. 2 is a functional block diagram of the parking assistance device 160 of the vehicle 100 according to the first embodiment. As illustrated in FIG. 2, the parking assistance device 160 of the first embodiment includes, as functional units, a storage control module 161, a detection module 162, a path generation module 163, a correction module 164, an extraction module 165, a position estimation module 166, a vehicle control module 167, a display control module 168, and a communication module 169.

The storage control module 161 causes a storage device to store travel information obtained when a driver of the vehicle 100 parks the vehicle 100 into a parking space from a parking start position. More specifically, the storage control module 161 causes the storage device (not illustrated) such as a hard disk drive (HDD) or a solid state drive (SSD) included in the vehicle 100 to store the travel information obtained when the vehicle 100 is parked into the parking space from the parking start position.

Note that traveling of the vehicle 100 moved from the parking start position to the parking space by manual driving of the driver is also referred to as teacher traveling. In addition, the travel information upon the teacher traveling is also referred to as training data. The training data includes information about a target parking position in the parking space in the teacher traveling, a speed of the teacher traveling, the steering angle in the teacher traveling, a braking operation in the teacher traveling, and a travel path (hereinafter, also referred to as teacher path) in the teacher traveling, and feature point information extracted from a surrounding image around the parking space captured during the teacher traveling. The teacher path is an example of the stored path.

Here, the information about the travel path in the teacher traveling includes information such as position coordinates on the path, a path length, a minimum turning radius, a wheel turning position, and a distance to the wall. Note that the teacher traveling is not limited to backward traveling, and may include forward traveling or both of the forward traveling and the backward traveling.

Note that the teacher path through which the driver has driven the vehicle backward to park in the garage (parking space) can be used also as the teacher path for removing the vehicle from the garage by reversely tracking the path from the garage.

Figure 3:
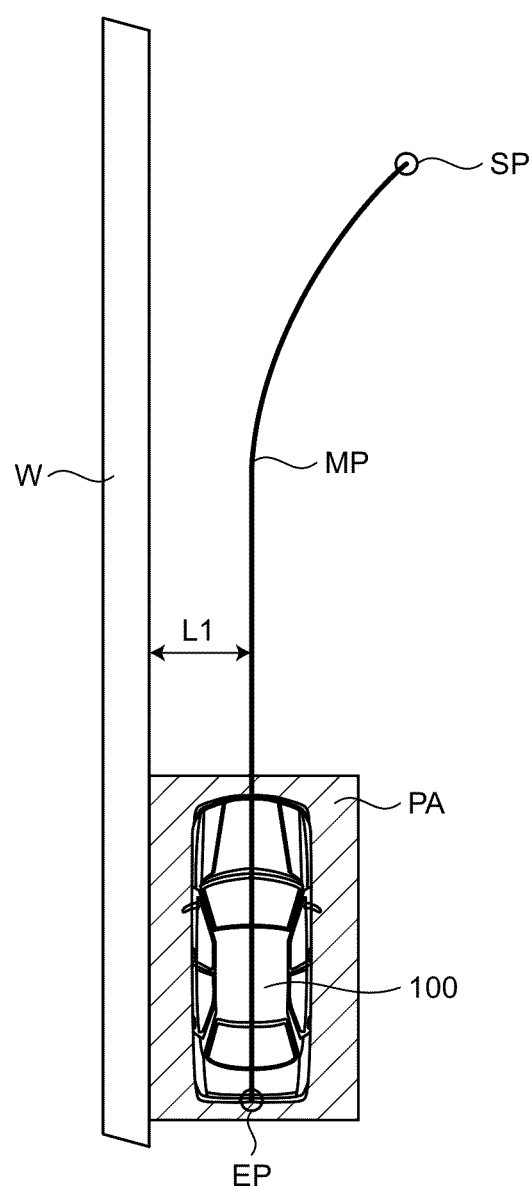
FIG. 3 is a diagram illustrating an example of a teacher path according to the embodiment.

FIG. 3 is a diagram illustrating an example of the teacher path. A teacher path MP illustrated in FIG. 3 represents the travel path through which the driver has moved the vehicle 100 to a parking end position EP in a parking space PA from a parking start position SP. In addition, the storage device of the vehicle 100 stores information about a distance L1 from a specific feature point on the teacher path MP to a wall W, as information about the teacher path MP.

Returning to FIG. 2, the description will be continued. The detection module 162 detects various information about an automatic parking process. For example, the detection module 162 detects the distance between the vehicle 100 and the wall at the parking start position, on the basis of information acquired from each wave transmitter/receivers 110. Here, in the present specification, the wall refers to a structure that defines the parking space such as the garage. Note that the wall may be a guide, a pole, a fence, or the like.

Note that the detection module 162 may detect information indicating the position of each unit of the vehicle 100 or an attitude of the vehicle 100 at the parking start position, or the like, on the basis of the information acquired from the wave transmitter/receiver 110 and imaging device 120. Furthermore, the detection module 162 may detect the obstacle or the like around the vehicle 100, on the basis of the information acquired from the wave transmitter/receiver 110 and imaging device 120.

The path generation module 163 generates a control path to be used for actual control of automatic parking of the vehicle 100, on the basis of the teacher path. For example, when receiving an instruction for automatic parking from the user, the path generation module 163 deforms the teacher path to generate the control path.

In an example, the path generation module 163 generates the control path so that a distance between the vehicle 100 and the wall estimated from the result of the detection by the detection module 162, a distance between the vehicle 100 and the wall at one or a plurality of feature points on the travel path, a position of each unit of the vehicle 100 or attitude of the vehicle 100, or the like coincide with the distance between the vehicle 100 and the wall, the position of each unit of the vehicle 100 or attitude of the vehicle 100, and the like at one or a plurality of feature points on the teacher path in the teacher traveling.

Note that the path generation module 163 may generate, as the control path, a path to adjust the attitude of the vehicle 100 so as to accurately park at the parking end position EP in the teacher traveling. In addition, the path generation module 163 may generate the control path by deforming the teacher path in real time, on the basis of the results, from the detection module 162, of the detection of the distance between the vehicle 100 and the wall and the position of each unit of the vehicle 100 or attitude of the vehicle 100.

Figure 4:
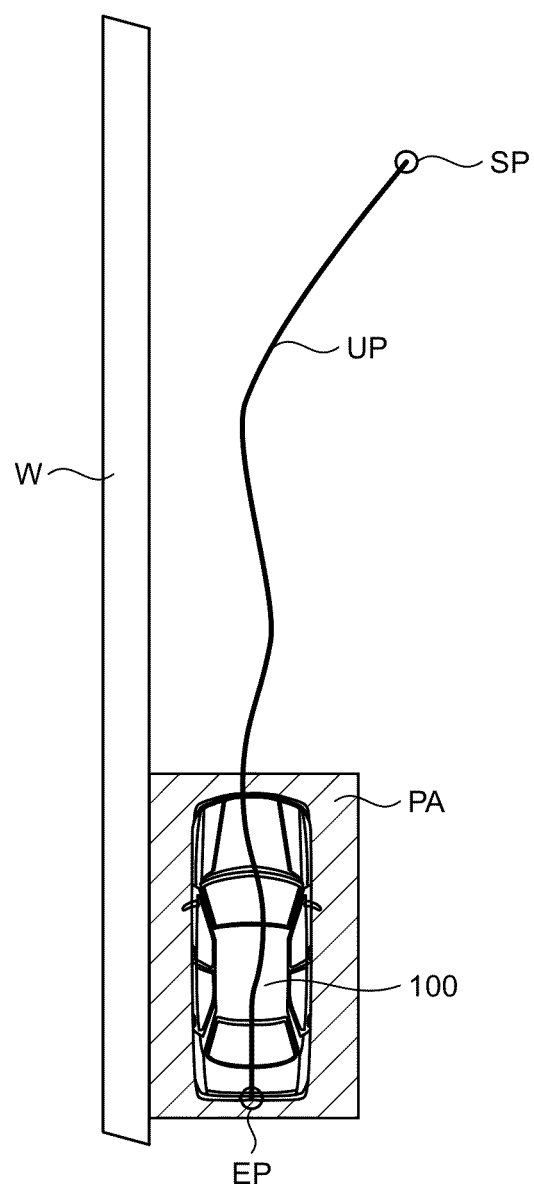
FIG. 4 is a diagram illustrating an example of a control path according to the embodiment.

FIG. 4 is a diagram illustrating an example of the control path. The control path UP illustrated in FIG. 4 is a path generated on the basis of the teacher path MP. In the example of FIG. 4, the parking start position SP and the parking end position EP are located at the same positions as those of the parking start position SP and the parking end position EP of the teacher path MP illustrated in FIG. 3. Note that the parking start position SP and the parking start position SP of the teacher path MP may not be at the same location.

Specifically, the control path UP is a path obtained by deforming the teacher path MP so that a distance between the vehicle 100 and the wall W and a position of each unit of the vehicle 100 or attitude of the vehicle 100 which are estimated at one or a plurality of feature points on the path coincide with the distance between the vehicle 100 and the wall W and the position of each unit of the vehicle 100 or attitude of the vehicle 100, at each of these feature points in the teacher traveling, on the basis of the distance between the vehicle 100 and the wall W and position of each unit of the vehicle 100 or attitude of the vehicle 100 which are detected at the parking start position.

Figure 5:
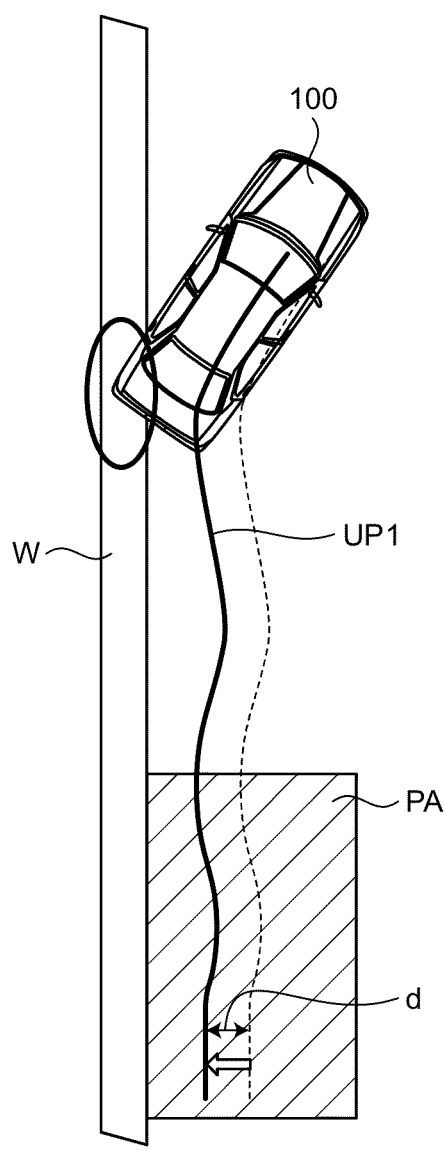
FIG. 5 is a diagram illustrating an example of a path obtained by simply moving the control path according to the embodiment toward a wall.

Incidentally, in an actual scene of automatic parking, it is considered that the user may desire to pull over to park for effective use of a narrow parking space. In this case, it is considered that the control path generated by the path generation module 163 is only required to be simply moved toward the wall. FIG. 5 is a diagram illustrating an example of a path obtained by simply moving the control path of FIG. 4 toward the wall W. FIG. 5 illustrates a control path UP1 that is a path obtained by moving the control path UP.

For example, in the example of FIG. 4, it is assumed that the user desires to park the vehicle 100 closer to the wall W by a distance d. In such a case, the control path UP1 is a path in which the control path UP of FIG. 4 is entirely moved toward the wall W by the distance d so as to park the vehicle 100 closer to the wall W by the distance d.

As illustrated in FIG. 5, when automatic parking control of the vehicle 100 is performed using the control path UP1, there is a possibility of contact of the vehicle 100 with the wall W. In order to avoid such contact, in the present embodiment, the correction module 164 is configured to generate a path capable of avoiding contact with the wall W on the basis of the teacher path.

Returning to FIG. 2, the description will be continued. The correction module 164 generates a corrected path by correcting the teacher path. For example, the correction module 164 corrects the control path generated on the basis of the teacher path, when receiving an instruction for pulling over to park from the user. Note that the correction module 164 may correct the control path in consideration of the distance between the vehicle 100 and the wall detected by the detection module 162.

In an example, the correction module 164 generates the corrected path by correcting the control path so that the parking end position is closer to the wall and a straight path leading to the parking end position near the wall has a longer distance. Note in this configuration, it is assumed that the straight line also includes a curve having a curvature below a predetermined threshold (the curvature is negligibly small).

As described above, the straight path kept longer reduces right and left swing of the vehicle 100 even upon feedback control which is described below, making it possible to reduce the possibility that the vehicle 100 collides with the wall.

Furthermore, when generating the corrected path, the correction module 164 generates the corrected path in consideration of a control error that may occur during control of the vehicle 100. For example, when the control error is 5 cm, the correction module 164 generates the corrected path so that the vehicle 100 does not contact with the wall even if the vehicle 100 deviates from the path by ±5 cm. This configuration makes it possible to prevent collision of the vehicle 100 with the wall even if the control error occurs.

Note that the correction module 164 may correct the teacher path itself to generate the corrected path as described above. Furthermore, the correction module 164 may generate the corrected path as described above by deforming the teacher path in real time, on the basis of the results, from the detection module 162, of the detection of the distance between the vehicle 100 and the wall and the position of each unit of the vehicle 100 or attitude of the vehicle 100.

Figure 6:
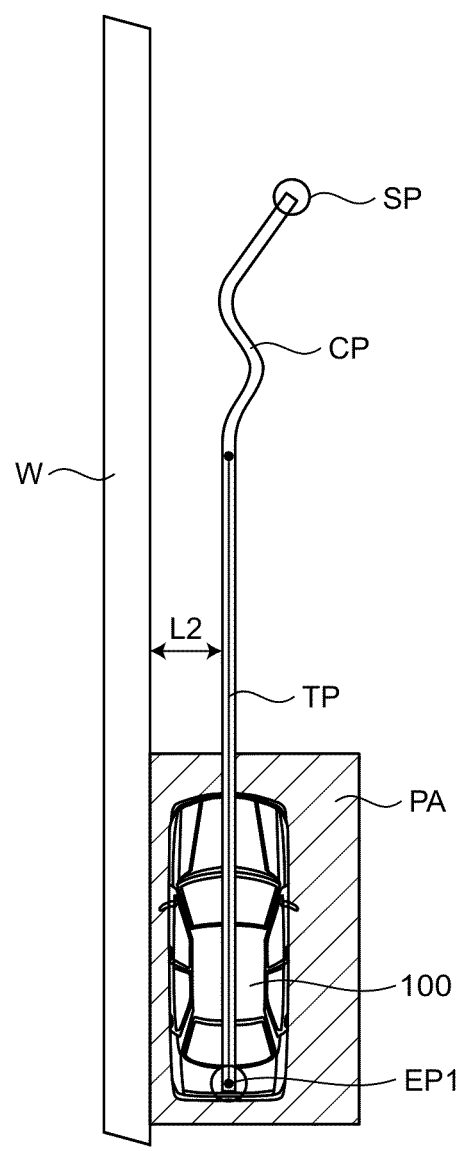
FIG. 6 is a diagram illustrating an example of a corrected path according to the embodiment.

FIG. 6 is a diagram illustrating an example of the corrected path. The parking start position SP of a corrected path CP illustrated in FIG. 6 and the parking start position SP of the teacher path MP of FIG. 3 are at the same location. Note that the parking start position SP may not be located at the same position as that of the teacher path MP. In addition, a parking end position EP1 of the corrected path CP is at a position closer to the wall W in a vehicle width direction relative to the parking end position EP of the teacher path MP of FIG. 3. The position of the parking end position EP1 is determined by the correction module 164 in consideration of the control error.

Furthermore, in the corrected path CP, a straight path TP extending from a point in front of the parking end position EP1 near the wall W to the parking end position EP1 is kept longer than the control path UP of FIG. 4 generated on the basis of the teacher path MP of FIG. 3.

In addition, a distance L2 from a specific feature point on the corrected path CP to the wall W is smaller than the distance L1 (see FIG. 3) from the feature point on the teacher path MP corresponding to the feature point to the wall W. Note that likewise in another feature point on the path which is not illustrated, it is assumed that a distance from the other feature point to the wall W is smaller than a distance from a feature point on the teacher path MP corresponding to the other feature point to the wall W.

In other words, the corrected path CP of FIG. 6 is a path which is closer to the wall W than the control path UP as a whole and in which the straight path TP extending from a point in front of the parking end position EP1 near the wall W to the parking end position EP1 is kept longer.

Returning to FIG. 2, the description will be continued. The extraction module 165 extracts the feature points from the surrounding image captured by the imaging device 120. A method of extracting the feature points by the extraction module 165 is not particularly limited, and a known method may be applied. For example, the extraction module 165 extracts the feature points by a method such as features from accelerated segment test (FAST) or oriented FAST and rotated BRIEF (ORB) may be adopted.

The position estimation module 166 receives the feature points extracted by the extraction module 165 and the feature points stored in the training data that the storage control module 161 has caused the storage device to store. The position estimation module 166 uses pattern matching, feature search, or the like to check the feature points extracted from the captured image captured by the imaging device 120 against the feature points stored in the training data.

Then, the position estimation module 166 selects several feature points at random from the feature points that are extracted from the captured image and that can be checked against the feature points stored in the training data, and estimates the current position of the vehicle 100 on the basis of positions of these several feature points in a camera image and three-dimensional positions of the several feature points in a real space.

The vehicle control module 167 controls the engine actuator 140, the brake actuator 150, and the steering actuator 130. In other words, the vehicle control module 167 is configured to control the steering, braking, and acceleration/deceleration of the vehicle 100 to control the vehicle 100. Furthermore, the vehicle control module 167 uses the control path generated by the path generation module 163 or the corrected path generated by the correction module 164 to perform automatic traveling (memory-assisted automatic parking) on the basis of an instruction given by the communication terminal 200.

In an example, when receiving an instruction for parking from the communication terminal 200 via the communication module 169, the vehicle control module 167 controls the vehicle 100 to move from the parking start position into the parking space, on the basis of the control path generated on the basis of the teacher path. Note that the vehicle control module 167 may transmit parking completion information that is a notification indicating the completion of the movement of the vehicle 100 from the parking start position to the parking space, to the communication terminal 200 via the communication module 169 which is described later.

Furthermore, when receiving an instruction for pulling over from the communication terminal 200 via the communication module 169 after receiving the instruction for parking, the vehicle control module 167 controls the vehicle 100 to move from the parking start position to the parking space on the basis of the corrected path obtained by correcting the control path.

As described above, in the present embodiment, the memory-assisted automatic parking is applied to parking of the vehicle into the parking space from the parking start position or removal of the vehicle from the parking space to the parking start position.

Note that when the vehicle 100 deviates from the control path or the corrected path, the vehicle control module 167 may move the vehicle 100 to return to the control path or the corrected path by the feedback control. In this configuration, for example, the vehicle control module 167 estimates a difference between the position of the vehicle 100 and the control path or corrected path, on the basis of the current position of the vehicle 100 estimated by the position estimation module 166, and causes the vehicle 100 to travel so as to reduce the difference.

The reason why the feedback control is performed is that, for example, the position of the vehicle 100 when the memory-assisted automatic parking is started does not coincide with the initial position of the teacher path in some cases. Performing the feedback control advantageously provides accurate final parking position, but easily causes right and left swing of the vehicle 100 during automatic traveling. In the present embodiment, the distance of the straight path leading to the parking end position near the wall in the corrected path generated by the correction module 164 is kept longer, and therefore, the possibility of collision of the vehicle 100 with the wall can be reduced even when the feedback control is performed.

Note that, when the obstacle is detected by the wave transmitter/receiver 110, the imaging device 120, another in-vehicle sensor, or the like during the parking control, the vehicle control module 167 may correct the travel path to include an avoidance path for avoiding the detected obstacle.

The display control module 168 causes a display device to display various information thereon. For example, the display control module 168 cooperates with the communication module 169 which is described later to cause a display of the communication terminal 200 to display a screen for receiving the instruction for parking from the user.

Figure 7:
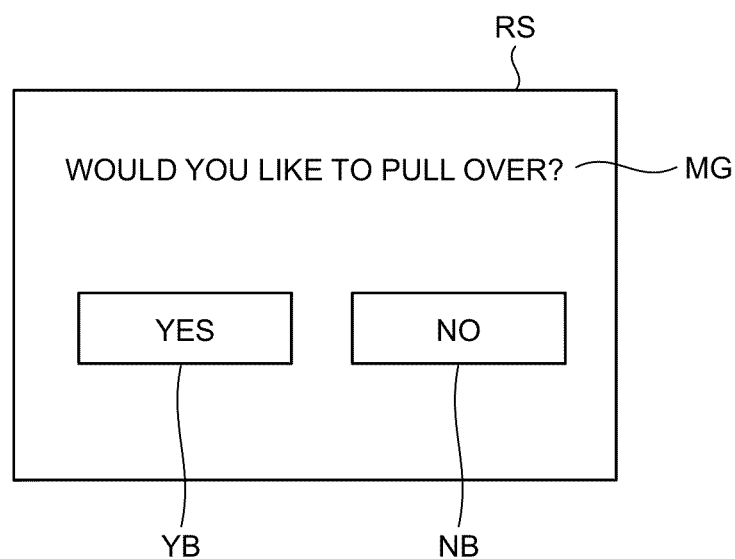
FIG. 7 is a diagram illustrating an example of a pulling-over instruction reception screen according to the embodiment.

Furthermore, for example, when receiving the instruction for parking from the user, the display control module 168 causes the display of the communication terminal 200 to display a screen for receiving the instruction for pulling over from the user. FIG. 7 is a diagram illustrating an example of a pulling-over instruction reception screen RS, and the pulling-over instruction reception screen RS of FIG. 7 includes a message MG, a first button YB, and a second button NB, as a screen configuration.

The message MG is a message that asks the user whether to pull over to park. In the example of FIG. 7, a character string "Would you like to pull over?" is displayed as the message MG, on the pulling-over instruction reception screen RS.

The first button YB is a button for receiving the instruction for pulling over, from the user. When the user presses the first button YB, the instruction for pulling over is transmitted from the communication terminal 200 to the parking assistance device 160. In this case, the vehicle control module 167 uses the corrected path to perform the automatic parking process.

The second button NB is a button for receiving an instruction not to pull over, from the user. When the user presses the second button NB, the communication terminal 200 transmits information indicating that pulling over is not performed, to the parking assistance device 160. In this case, the vehicle control module 167 uses the control path to perform automatic parking.

In addition, when the obstacle is detected by the wave transmitter/receiver 110, the imaging device 120, another in-vehicle sensor, or the like and the vehicle control module 167 fails to generate the avoiding path, the display control module 168 may display a message to the user to remove the obstacle, on the display of the communication terminal 200.

Note that the display control module 168 may cause a display or the like of a car navigation device mounted on the vehicle 100 to display various information.

Returning to FIG. 2, the description will be continued. The communication module 169 controls a communication interface (not illustrated) of the parking assistance device 160 to communicate with the communication terminal 200. For example, the communication module 169 receives the instruction for automatic parking and the instruction for pulling over, from the communication terminal 200. Furthermore, for example, the communication module 169 may transmit, to the communication terminal 200, information indicating that the vehicle 100 stops during automatic parking or that the obstacle is in the vicinity of the vehicle 100.

Configuration of Communication Terminal

The communication terminal 200 is a communication terminal used by the user. Examples of the communication terminal 200 include a smartphone and a tablet terminal. The communication terminal 200 communicates with the vehicle 100 via the network N.

Furthermore, the communication terminal 200 displays a system for automatic parking related to the vehicle 100. Operating the communication terminal 200 by the user makes it possible to remotely operate the vehicle 100 even after the user gets out of the vehicle 100. In other words, operating the communication terminal 200 by the user makes it possible to give an instruction for automatic parking, from outside the vehicle 100.

Process by Parking Assistance Device

Figure 8:
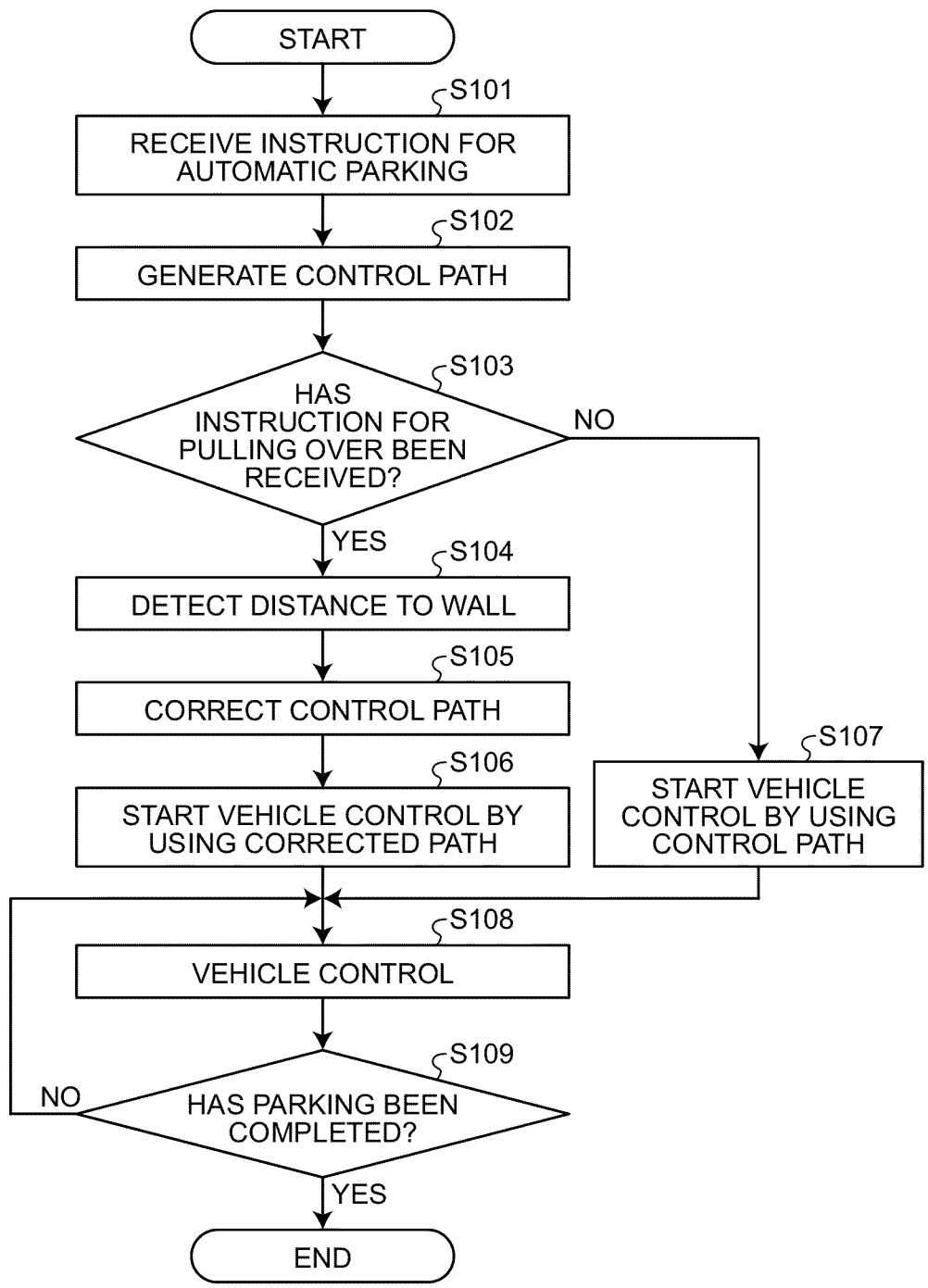
FIG. 8 is a flowchart illustrating an example of a process performed by the parking assistance system according to the embodiment.

Next, a process performed by the parking assistance device 160 according to the present embodiment will be described. FIG. 8 is a flowchart illustrating an example of the process performed by the parking assistance device 160 according to the present embodiment.

First, the vehicle control module 167 receives the instruction for automatic parking (Step S101). For example, the vehicle control module 167 receives the instruction for automatic parking from the user via the communication terminal 200.

Next, the path generation module 163 generates the control path on the basis of the teacher path (Step S102). For example, the path generation module 163 deforms the teacher path, on the basis of the distance between the vehicle 100 and the wall detected by the detection module 162, the position of each unit of the vehicle 100 or attitude of the vehicle 100, and the like to generate the control path.

Next, the vehicle control module 167 determines whether the instruction for pulling over has been received from the user (Step S103). For example, the vehicle control module 167 determines whether the instruction for pulling over has been received from the user via the communication terminal 200.

When the instruction for pulling over has been received from the user (Step S103: Yes), the detection module 162 detects the distance from the vehicle 100 to the wall (Step S104). For example, the detection module 162 detects the distance from the vehicle 100 to the wall, from the detection result of each wave transmitter/receiver 110, each imaging device 120, or the like.

Note that, in the processing of Step S104, the detection module 162 may detect the position of each unit of the vehicle 100 or attitude of the vehicle 100. Furthermore, the detection module 162 may continuously perform the processing of Step S104 while the automatic parking process is being executed. In this configuration, the processing of Step S104 may be performed before the processing of Step S102.

Next, the correction module 164 generates the corrected path obtained by correcting the control path (Step S105). For example, the correction module 164 generates the corrected path by correcting the control path so that the parking end position is closer to the wall and the straight path leading to the parking end position near the wall has a longer distance.

Next, the vehicle control module 167 uses the corrected path to start the automatic parking control (Step S106). Specifically, the vehicle control module 167 starts control of the vehicle 100 so that the vehicle 100 moves from the current position of the vehicle 100 serving as the parking start position to the parking space on the basis of the corrected path generated in Step S105.

Next, the vehicle control module 167 controls the vehicle 100 to move the vehicle 100 to the parking space (Step S108).

For example, while moving the vehicle 100 to the parking space along the corrected path or the control path, the vehicle control module 167 determines whether the vehicle 100 deviates from the control path or the corrected path, on the basis of the detection results, from the detection module 162, of the distance between the vehicle 100 and the wall and the position of each unit of the vehicle 100 or attitude of the vehicle 100. When the vehicle 100 deviates from the control path or the corrected path, the vehicle control module 167 performs control to move the vehicle 100 so as to return to the control path or the corrected path by feedback control.

Next, the vehicle control module 167 determines whether parking of the vehicle 100 has been completed (Step S109). Specifically, the vehicle control module 167 determines whether the vehicle 100 has been parked in the parking space, on the basis of the sensor data of the wave transmitter/receiver 110 or the captured image captured by the imaging device 120.

When parking of the vehicle 100 has been completed (Step S109: Yes), the vehicle control module 167 finishes the present process. On the other hand, when parking of the vehicle 100 has not been completed (Step S109: No), the automatic parking control is continued, and the process returns to Step S108.

When the instruction for pulling over has not been received from the user in Step S103 (Step S103: No), the vehicle control module 167 uses the control path to start automatic parking control. (Step S107). Specifically, the vehicle control module 167 starts control of the vehicle 100 so that the vehicle 100 moves from the current position of the vehicle 100, which is the parking start position, to the parking space, on the basis of the control path generated in Step S102. Since the processing steps after Step S108 are similar to the above description, the description thereof will be omitted.

Effects of Parking Assistance Device

Next, effects of the parking assistance device 160 according to the present embodiment will be described. The parking assistance device 160 according to the present embodiment corrects the teacher path based on the teacher traveling by the user so that the position of the parking end position of the vehicle 100 in the vehicle width direction is closer to the wall and a path to the parking end position whose curvature is smaller than the threshold is kept longer, according to a relative positional relationship between the start position of the automatic traveling on the teacher path and the wall defining a parking area that is configured to park the vehicle 100.

Therefore, the parking assistance device 160 can cause the vehicle 100 to pull over to park based on the teacher path. In addition, keeping the substantially straight path extending from a point in front of the parking end position near the wall to the parking end position long makes it possible to reduce the possibility that the vehicle 100 may collide with the wall, even when the feedback control is performed. In other words, according to the parking assistance device 160 according to the present embodiment, it is possible to improve the accuracy of pulling over to park based on the stored path.

In addition, the parking assistance device 160 according to the present embodiment detects the distance between the vehicle 100 and the wall, and corrects the teacher path according to the detected distance. This consideration makes it possible to correct the teacher path in consideration of an actual distance between the vehicle 100 and the wall, and the vehicle 100 can pull over to park with a reduced possibility of collision with the wall.

In addition, the parking assistance device 160 according to the present embodiment generates the corrected path in consideration of the control error. Therefore, the parking assistance device 160 according to the present embodiment can reduce the possibility of collision of the vehicle 100 with the wall, even when the control error occurs while the vehicle 100 is controlled to pull over to park.

In addition, the parking assistance device 160 according to the present embodiment performs a process of correcting the teacher path when the instruction for pulling over to park is given from the user. This configuration makes it possible to perform the automatic parking process based on the corrected path, only when the user desires the pulling over to park.

According to the parking assistance device of the present disclosure, it is possible to improve the accuracy of pulling over to park based on the stored path.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A parking assistance device performing automatic traveling of a vehicle based on teacher traveling by a user, the parking assistance device comprising:
   a memory; and
   a processor coupled to the memory and configured to:
   cause the memory to store information about a travel path in the teacher traveling;
   correct the travel path in order that a position of a target position of the automatic traveling in a vehicle width direction is closer to a structure defining a parking area configured to park the vehicle and a path to the target position having a curvature smaller than a threshold is kept longer, according to a relative positional relationship between the structure and a start position of the automatic traveling on the travel path; and
   control the vehicle based on the corrected travel path.

2. The parking assistance device according to claim 1, wherein
   the processor is further configured to:
   detect the structure defining the parking area configured to park the vehicle; and
   correct the travel path in order that the travel path is closer to the structure as a whole and the path to the target position having the curvature smaller than the threshold is kept longer, according to the detected position of the structure.

3. The parking assistance device according to claim 1, wherein
   the processor is configured to:
   correct the travel path when receiving an instruction for parking the vehicle closer to the structure from a user; and
   control the vehicle, based on the travel path stored, when receiving no instruction for parking the vehicle closer to the structure from the user.

4. The parking assistance device according to claim 2, wherein
   the processor is configured to:
   correct the travel path when receiving an instruction for parking the vehicle closer to the structure from a user; and
   control the vehicle, based on the travel path stored, when receiving no instruction for parking the vehicle closer to the structure from the user.

5. The parking assistance device according to claim 3, wherein
   the processor is further configured to:
   cause a display device to display a reception screen for receiving an instruction about whether to park the vehicle closer to the structure, for the user, before start of the automatic traveling; and
   receive the instruction about whether to park the vehicle closer to the structure, from the user, via the reception screen.

6. The parking assistance device according to claim 4, wherein
   the processor is further configured to:
   cause a display device to display a reception screen for receiving an instruction about whether to park the vehicle closer to the structure, for the user, before start of the automatic traveling; and receive the instruction about whether to park the vehicle closer to the structure, from the user, via the reception screen.

7. The parking assistance device according to claim 1, wherein
the processor is further configured to correct the travel path in order that the travel path is spaced apart from the structure by a predetermined distance.

8. The parking assistance device according to claim 2, wherein
the processor is further configured to correct the travel path in order that the travel path is spaced apart from the structure by a predetermined distance.

9. A parking assistance method of performing automatic traveling of a vehicle based on teacher traveling by a user, the method comprising:
causing a memory to store information about a travel path in the teacher traveling;
correcting the travel path in order that a position of a target position of the automatic traveling in a vehicle width direction is closer to a structure defining a parking area configured to park the vehicle and a path to the target position having a curvature smaller than a threshold is kept longer, according to a relative positional relationship between the structure and a start position of the automatic traveling on the travel path; and
controlling the vehicle based on the corrected travel path.

10. The parking assistance method according to claim 9, further comprising:
detecting the structure defining the parking area configured to park the vehicle, wherein
the correcting includes correcting the travel path in order that the travel path is closer to the structure as a whole and the path to the target position having the curvature smaller than the threshold is kept longer, according to the detected position of the structure.

11. The parking assistance method according to claim 9, wherein
the correcting includes correcting the travel path when receiving an instruction for parking the vehicle closer to the structure from a user; and
the controlling includes controlling the vehicle, based on the travel path stored, when receiving no instruction for parking the vehicle closer to the structure from the user.

12. The parking assistance method according to claim 10, wherein
the correcting includes correcting the travel path when receiving an instruction for parking the vehicle closer to the structure from a user; and
the controlling includes controlling the vehicle, based on the travel path stored, when receiving no instruction for parking the vehicle closer to the structure from the user.

13. The parking assistance method according to claim 11, further comprising:
causing a display device to display a reception screen for receiving an instruction about whether to park the vehicle closer to the structure, for the user, before start of the automatic traveling; and
receiving the instruction about whether to park the vehicle closer to the structure, from the user, via the reception screen.

14. The parking assistance method according to claim 12, further comprising:
causing a display device to display a reception screen for receiving an instruction about whether to park the vehicle closer to the structure, for the user, before start of the automatic traveling; and
receiving the instruction about whether to park the vehicle closer to the structure, from the user, via the reception screen.

15. The parking assistance method according to claim 9, wherein
the correcting includes correcting the travel path in order that the travel path is spaced apart from the structure by a predetermined distance.

16. The parking assistance method according to claim 10, wherein
the correcting includes correcting the travel path in order that the travel path is spaced apart from the structure by a predetermined distance.

* * * * *